(12) United States Patent
Michalko

(10) Patent No.: US 7,800,245 B2
(45) Date of Patent: Sep. 21, 2010

(54) METHOD AND ARCHITECTURE FOR REDUCTION IN VEHICLE WIRING

(75) Inventor: Rodney G. Michalko, Queensville (CA)

(73) Assignee: Honeywell International Inc., Morristown, NJ (US)

( * ) Notice: Subject to any disclaimer, the term of this patent is extended or adjusted under 35 U.S.C. 154(b) by 480 days.

(21) Appl. No.: 11/822,617

(22) Filed: Jul. 9, 2007

(65) Prior Publication Data

US 2009/0015063 A1    Jan. 15, 2009

(51) Int. Cl.
*H02J 3/38* (2006.01)
*H02J 3/06* (2006.01)

(52) U.S. Cl. ...................................... 307/19
(58) Field of Classification Search .................... 307/19
See application file for complete search history.

(56) References Cited

U.S. PATENT DOCUMENTS

| | | | |
|---|---|---|---|
| 4,967,096 A | 10/1990 | Diemer et al. | |
| 5,612,579 A | 3/1997 | Wisbey et al. | |
| 5,764,502 A | 6/1998 | Morgan et al. | |
| 5,850,113 A | 12/1998 | Weimer et al. | |
| 6,633,802 B2 | 10/2003 | Sodoski et al. | |
| 6,778,414 B2 | 8/2004 | Chang et al. | |
| 2002/0113167 A1 | 8/2002 | Albero et al. | |
| 2004/0129835 A1 | 7/2004 | Atkey et al. | |
| 2006/0061213 A1 | 3/2006 | Michalko | |
| 2006/0102790 A1 | 5/2006 | Atkey et al. | |
| 2008/0231252 A1* | 9/2008 | Nho et al. ................... | 323/350 |

FOREIGN PATENT DOCUMENTS

| | | |
|---|---|---|
| CA | 2501495 | 5/2004 |
| WO | WO-2004/037641 | 5/2004 |

* cited by examiner

*Primary Examiner*—Fritz M Fleming
*Assistant Examiner*—Dru M Parries
(74) *Attorney, Agent, or Firm*—Oral Caglar, Esq.

(57) ABSTRACT

Systems and methods perform power conversion and distribution. A system for power conversion and distribution, according to one embodiment comprises: a first generator substation (70) receiving power from a first electrical generator (10); a first main substation (100) for distributing converted power to at least one load, said load being local to the first main substation (100); a ring bus including ring bus feeders (1000, 2000); and at least one satellite substation (700) for powering a remote load, wherein the ring bus feeders (1000, 2000) connect the first generator substation (70) and the first main substation (100) in a ring arrangement, and the at least one satellite substation (700) receives power from the ring bus through a branch substation (500).

17 Claims, 13 Drawing Sheets

METHOD AND ARCHITECTURE FOR REDUCTION IN VEHICLE WIRING

BACKGROUND OF THE INVENTION

1. Field of the Invention

The present invention relates to electrical systems for vehicles, and more particularly to a method and architecture for reduction of vehicle wiring through incorporation of modular power distribution panels providing primary and secondary distribution functions in a ring arrangement, and for implementation of point of use conversion devices to provide appropriate electrical power type and quality.

2. Description of the Related Art

A typical/conventional vehicle electrical distribution system is shown in FIG. 1. The electrical distribution system illustrated in FIG. 1 obtains power from various electrical power sources (10A, 10B, 20A, 20B, 50A and 50B) and distributes the power to various vehicle utilization systems and associated loads. Power supply systems 10A, 10B, 20A, 20B, 50A and 50B are exemplary generators, as illustrated in FIG. 1. Systems 10A, 10B, 20A, 20B, 50A and 50B may also be, or may include as needed, batteries, fuel cells and the like, to provide a primary electrical power source to an electrical distribution and conversion system. Vehicle utilization systems and loads include (but are not limited to) lights, valves, fans, pumps, actuators, and any other services required for performing utility functions on-board a vehicle during normal or abnormal operations.

FIG. 1 illustrates an existing typical/conventional electrical power system for vehicles. The electrical power system in FIG. 1 provides power generation, conversion and distribution functions. The electrical power system illustrated in FIG. 1 uses distribution panels (1100A, 1100B, 1200A, 1200B) for power network switching, load control and circuit protection. The panels are typically located at centralized positions within the vehicle. These distribution panels are generally categorized and segregated into distinct panels for primary power, high voltage (1100A and 1100B), primary power, low voltage (1200A and 1200B), secondary power distribution and protection (1300A and 1300B), and emergency power (1300C). The circuit breaker and emergency panels are located within reach of the crew, to allow for necessary crew interaction with the panels during vehicle operation. Most of the other panels are located in a common electrical bay, usually below or in the vicinity of the crew compartment. Distribution feeder cables 009A through 009F connect the power sources 10A, 10B, 20A, 20B, 50A and 50B to the centralized primary power distribution panels 1100A and 1100B in the electrical bay described above. The centralized primary power distribution panels 1100A and 1100B include, but are not limited to, electrical contactors, bus bars, relays, current and voltage monitoring and circuit protection devices, and electrical hardware arranged and connected for proper and safe distribution of bulk power provided by various power input sources 10A, 10B, 20A, 20B, 50A and 50B.

A certain amount of high voltage power may be used locally, for high power systems such as pumps, fans or actuators. This amount of high voltage power is supplied directly from the high voltage buses 1110 and 1120 in the primary power distribution panels 1100A and 1100B. Much of the high voltage power, however, is routed to conversion devices which transform high voltage and current to conventional voltages used by existing legacy equipment. Such legacy equipment includes various items of vehicle equipment previously designed for existing vehicles. Legacy equipment is reused because of industry availability and/or fleet logistics.

Voltage conversion is typically performed by transformers, to obtain 115V AC power. Autotransformers (ATU) 1400A and 1400B are typically used for this purpose. Autotransformers use a common winding on the core without electrical isolation between primary and secondary stages. Hence, autotransformers have lower weight and are superior to classical transformers which have fully isolated primary and secondary windings. Transformer rectifier units (TRU) 1500A and 1500B combine both transformer and rectifiers within the same device, and are similarly used to obtain 28V DC from the high voltage primary power.

The transformed low voltage power is supplied to a second lower tier primary distribution panel (1200A, 1200B) via feeders 014A, 014B, 015A and 015B. The bulk power in these sub tier primary panels is subsequently subdivided into smaller portions (>50 Amperes) which are then routed to secondary power distribution panels (1300A, 1300B, 1300C) or directly to larger loads such as, but not limited to, fans, pumps, and heater loads from power buses 1210 and 1220. The sub tier primary power panels are close to the high voltage primary panels in the electrical bay, and, hence, form a centralized distribution system.

The 115V AC and 28V DC power routed to the secondary distribution panels (1300A, 1300B, 1300C) is further subdivided into individual utilization load levels (<30 Amperes) within the left and right secondary power distribution panels 1300A, 1300B and 1300C.

Due to the grouping of the primary distribution panels shown in FIG. 1, panels which are typically co-located in the electrical bay, the number of large diameter cables required to conduct high power from generators to various distribution panels is reduced in the "centralized" architecture of FIG. 1. However, smaller size wiring 018A, 018B, 018C, 019A, 019B, and 019C that connects central panel positions to aircraft wide utilization loads, and cables 016A, 016B, 016C, 016D, 017A, 017B, 017C and 017D that connect primary low voltage panels 1200A and 1200B to crew compartment mounted secondary and emergency power distribution panels 1300A, 1300B and 1300C, account for the bulk of the aircraft wiring weight. Large numbers of wires of smaller size are needed for a large number of single electrical loads that ultimately require a supply of power to function. For example, as many as 2000 single electrical loads can be present in a large commercial aircraft. While an individual small gauge wire does not present a significant weight, many such wires extending along great distances generate the most significant weight component for a particular vehicle system. Reducing the length of these wires can lead to significant weight reduction in a vehicle.

The traditional architecture illustrated in FIG. 1 was created to facilitate operator interaction with circuit protection devices while the vehicle is in operation. Additional benefits of such a centralized electrical bay installation were the consolidation of electrical equipment installations for manufacturing and maintenance tasks. To meet operator interface requirements, all secondary distribution had to be routed to the crew compartment location first. In aircraft applications, for example, a centralized electrical bay located below the flight deck provided a location for electrical hardware in proximity of flight deck interfaces.

Modern aircraft electrical power systems have moved away from the centralized architecture illustrated in FIG. 1. This development was spurred by the advent of remotely controlled switches and circuit protection devices that enabled the crew to monitor loads and change the status of circuit protection devices anywhere on the aircraft using digital network communications. In modern aircraft electrical power systems, individual load switches and protection are moved closer to the loads, using many smaller secondary distribution panels. These non-centralized secondary power distribution architectures bring weight and installation benefits, because they reduce the length of individual load small gauge wiring. Thus, non-centralized secondary power distribution architectures reduce the overall weight of secondary power wiring used for a vehicle wiring installation.

However, conventional centralized primary distribution panels are still used in the non-centralized secondary power distribution architectures. For this reason, cabling from the primary low voltage panels to remote secondary panels still account for a large wiring weight. Furthermore, these relatively large secondary feeders introduce new installation provision needs and routing problems, which diminish the benefits of modern aircraft electrical power distribution systems.

A modern typical/conventional non-centralized secondary power distribution architecture is generally represented in FIG. 2. The architecture in FIG. 2 is similar to the architecture in FIG. 1. However, in FIG. 2, the secondary power distribution and emergency panels, which were located in the crew compartment in FIG. 1, have been replaced by smaller remote distribution panels. An emergency power distribution panel has been omitted from the diagram of FIG. 2 to simplify the representation. Such a panel could be included in FIG. 2. However, in modern architectures, emergency functions are often consolidated into the remote systems, by providing a dedicated remote panel for emergency services, for example. One drawback of the non-centralized secondary power distribution architecture of FIG. 2 is the associated weight of power feeders (016A, 016B, 017A, 017B) that connect many secondary power distribution boxes (1300A, 1300B, 1300C, 1300D, 1300E, 1300F) to centralized primary power distribution equipment (panels 1200A and 1200B). The large number of power feeders connecting the centralized power distribution equipment to secondary power distribution boxes generates significant wiring weight. Also, the feeders connecting centralized power distribution equipment to secondary power distribution boxes have larger gauge, in order to reduce losses while distributing low voltage power over long distances within the vehicle, to supply low voltage power to distributed loads.

If the voltage level on a feeder cable is a conventional power voltage, such as 115 VAC or 28 VDC, the current in the feeder cable can be high for a given power transmission requirement. Consequently, feeder wire with large gauge is needed for the feeder cables, to carry large currents and minimize voltage drop over long distances. For reasons mentioned above, the feeder cables generate a significant weight in a typical/conventional vehicle distribution system. Hence, these feeder cables add significant weight in distributed secondary power architectures.

FIGS. 1 and 2 include, for completeness, double voltage (230V AC) power generation levels that are commonly permitted in contemporary vehicle designs. In some architectural configurations, vehicle designs may still incorporate 115V AC power generation, in order to eliminate the 230 VAC primary power panels (1110A, 1200A) and the ATUs (1400A, 1400B). Power panels 1200A and 1200B are typically split so that the power supply feeds 115V AC power into the primary AC panel, and the TRUs (1500A, 1500B) transform a portion of the 115V AC to 28V DC. The 28 V DC power may be further distributed by another such panel.

Current designs for aircraft electric power generation have moved to high voltage power outputs (230 VAC). High voltage power outputs enable lower current, high power generation, and facilitate dual use of the power generation source as a starter motor for the turbine engine on "More Electric" vehicles. Higher output voltage is useful for bulk power applications such as electrically driven pumps, fans and motor control electronic devices. However, higher output voltage is unsuitable for most general utility consumption applications, because existing utilization equipment available from current industry sources operates at lower voltage levels. Moreover, high output voltages that are generally distributed can cause human interaction safety concerns during direct operation and maintenance contact.

Therefore, high output voltage power obtained from a generator and passed into a primary power distribution panel, needs to be transformed to provide conventional power voltages, such as 115 VAC and 28 VDC for utilization equipment. This electrical power transformation is typically achieved through the use of large centralized power conversion equipment (ATUs 1400A and 1400B, TRUs 1500A and 1500B) located in the electrical bay next to the primary panels. Transformers 1400A and 1400B convert 230 VAC to 115 VAC. Similarly, transformer-rectifier units 1500A and 1500B use a 230V AC input, pass this power through a suitable step down winding, and further rectify the output to provide 28 VDC. A second primary distribution panel set 1200A and 1200B receives the converted power. The second primary distribution panel set performs power protection and distribution functions, and provides lower voltages to the distributed secondary power panels.

In the contemporary power distribution architecture described in FIG. 2, distributed secondary power boxes 1300A to 1300F are implemented like a conventional large individual load. For example, throughout the aircraft, distributed secondary power boxes are implemented with protection circuit breakers 1250A, 1250B and 1250C, along with cabling 016A, 016B, 017A, and 017B. Cabling 016A, 016B, 017A, and 017B connect the secondary distribution panels to the centralized power panel. However, cabling that connects the distributed secondary power boxes to the centralized power panel adds weight and complexity to the vehicle wiring. The added weight and complexity are related to the large gauge of cables. The large cable gauge is needed to satisfy installation requirements, and maintain voltage drop limits for higher current at a lower voltage level.

Disclosed embodiments of this application address these and other issues by utilizing an integral method and architecture for power distribution that reduces vehicle wiring in a system of distributed secondary power units, by using high voltage primary power and distributed low voltage conversion equipment. The architecture of the present invention extends the point-to-point generator output distribution to forward and aft electrical bays by implementing a ring distribution feeder approach. A high voltage ring is used to route power around the vehicle, hence providing bulk power to aircraft areas where electrical utility loads exist. Local conversion and secondary distribution of power are performed at appropriate locations along the primary power ring periphery. Such locations are identified by detailed study of a vehicle load locations and equipment location potential. Embodiments described in this application use a ring bus to distribute high voltage directly to an area of utilization serviced by secondary power distribution panels. Embodiments described in this application minimize wire gauge and reduce the length required for wires that distribute power to secondary power boxes. The ring architecture of the current invention uses forward and aft running "point to point" cabling, and makes full use of installed high voltage distribution cables, by completing a ring connection at specific locations. Appropriately sized local power conversion equipment items are placed adjacent to the secondary power distribution panels, and generate conventional power for local equipment. Embodiments described in this application eliminate dedicated feeders to secondary power distribution panels, offer alternative and more efficient power distribution solutions, and provide higher availability for electrical power distribution, through coordination of ring bus contactors and protection devices. Such coordination may be achieved with an expert supervisory control system with advanced control capabilities.

SUMMARY OF THE INVENTION

The present invention is directed to systems and methods for power conversion and distribution. According to a first aspect of the present invention, a system for power conversion and distribution comprises: a first generator substation receiving power from a first electrical generator; a first main substation for distributing converted power to at least one load, said load being local to the first main substation; a ring bus including ring bus feeders; and at least one satellite substation for powering a remote load, wherein the ring bus feeders connect the first generator substation and the first main substation in a ring arrangement, and the at least one satellite substation receives power from the ring bus through a branch substation.

According to a second aspect of the present invention, a system for power conversion and distribution comprises: a left generator substation for receiving power from a left electrical generator; a right generator substation for receiving power from a right electrical generator; a forward main substation for converting power for at least one forward local load; an aft main substation for converting power for at least one aft local load; a ring bus including ring bus feeders; and a branch substation along the ring bus for supplying at least one satellite substation for powering a remote load, wherein the ring bus feeders connect the left generator substation, the right generator substation, the forward main substation and the aft main substation in a ring arrangement, and the at least one satellite substation receives power from the ring bus via the branch substation that intersects the ring bus.

According to a third aspect of the present invention, a method for secondary power conversion and distribution comprises: receiving power from an electrical generator; transporting power along a ring path to a first location and a second location; converting power at the first location for use by a local load; converting power at the second location for use by a remote load; and transporting power from the second location to the remote load.

BRIEF DESCRIPTION OF THE DRAWINGS

Further aspects and advantages of the present invention will become apparent upon reading the following detailed description in conjunction with the accompanying drawings, in which.

DETAILED DESCRIPTION

Figure 3:
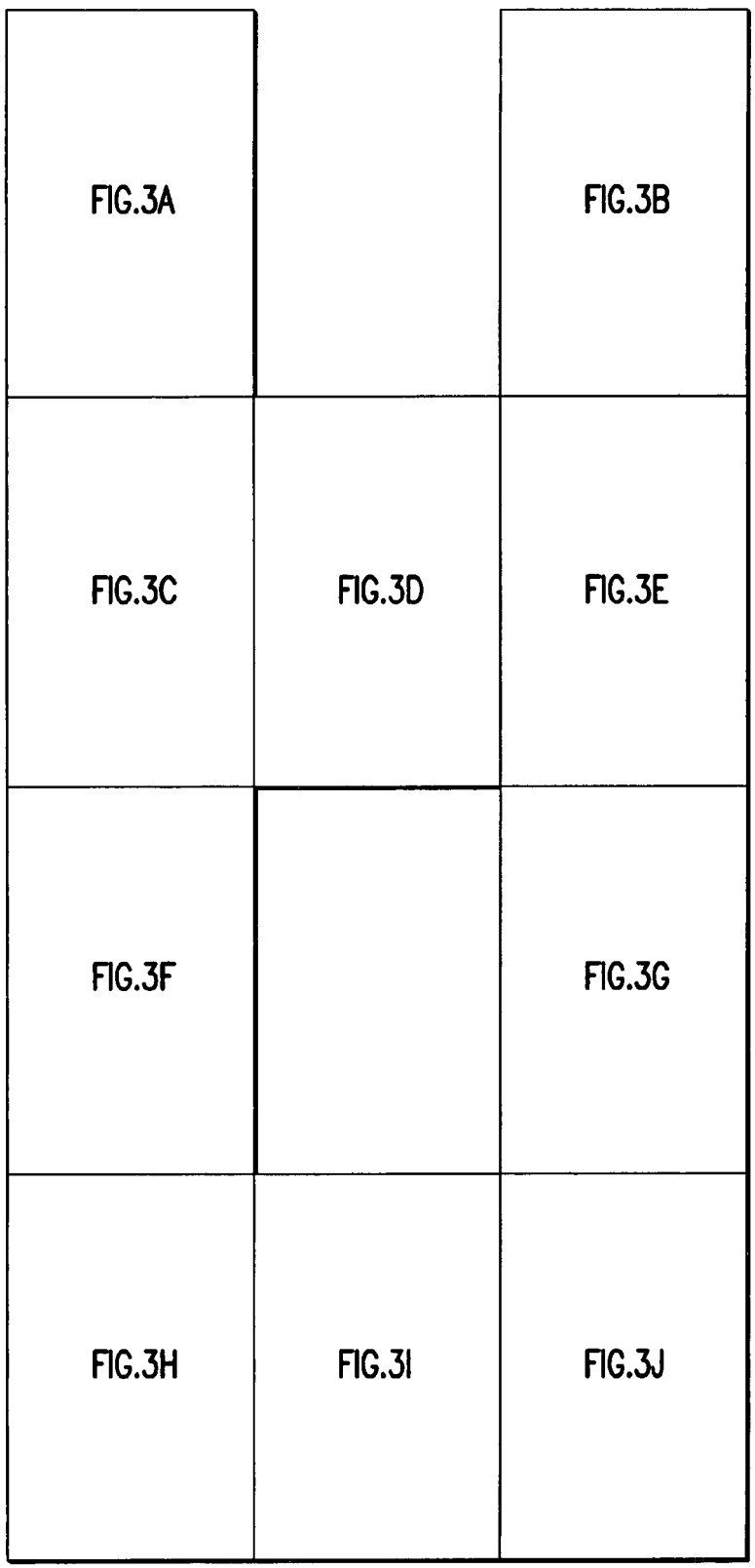
FIG. 3 is a diagram of an exemplary architecture that reduces wiring by using high voltage primary power distribution and transmission and distributed low voltage conversion equipment in a ring arrangement to feed secondary power boxes, according to an embodiment of the present invention.
Figure 3A:
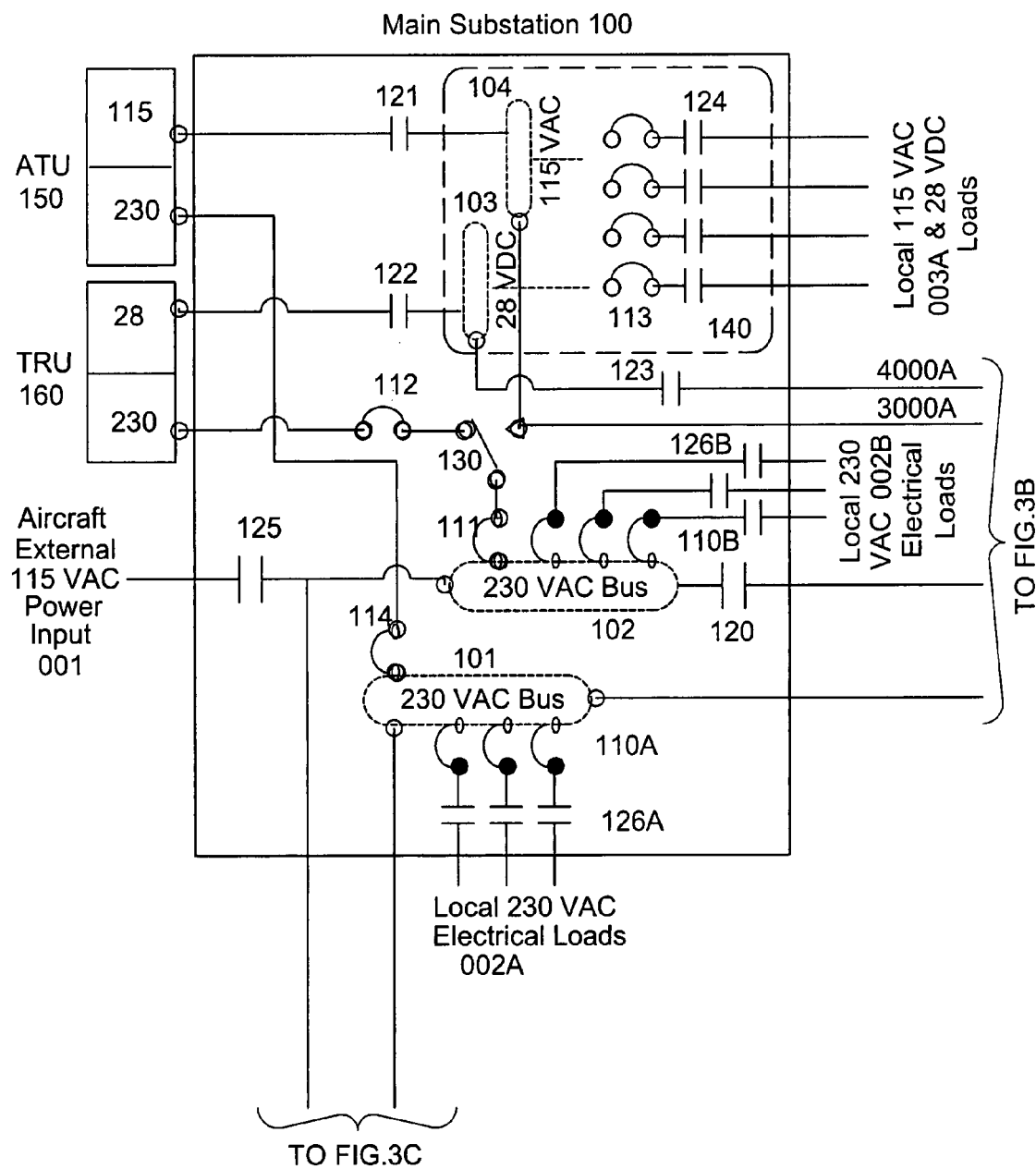
Figure 3B:
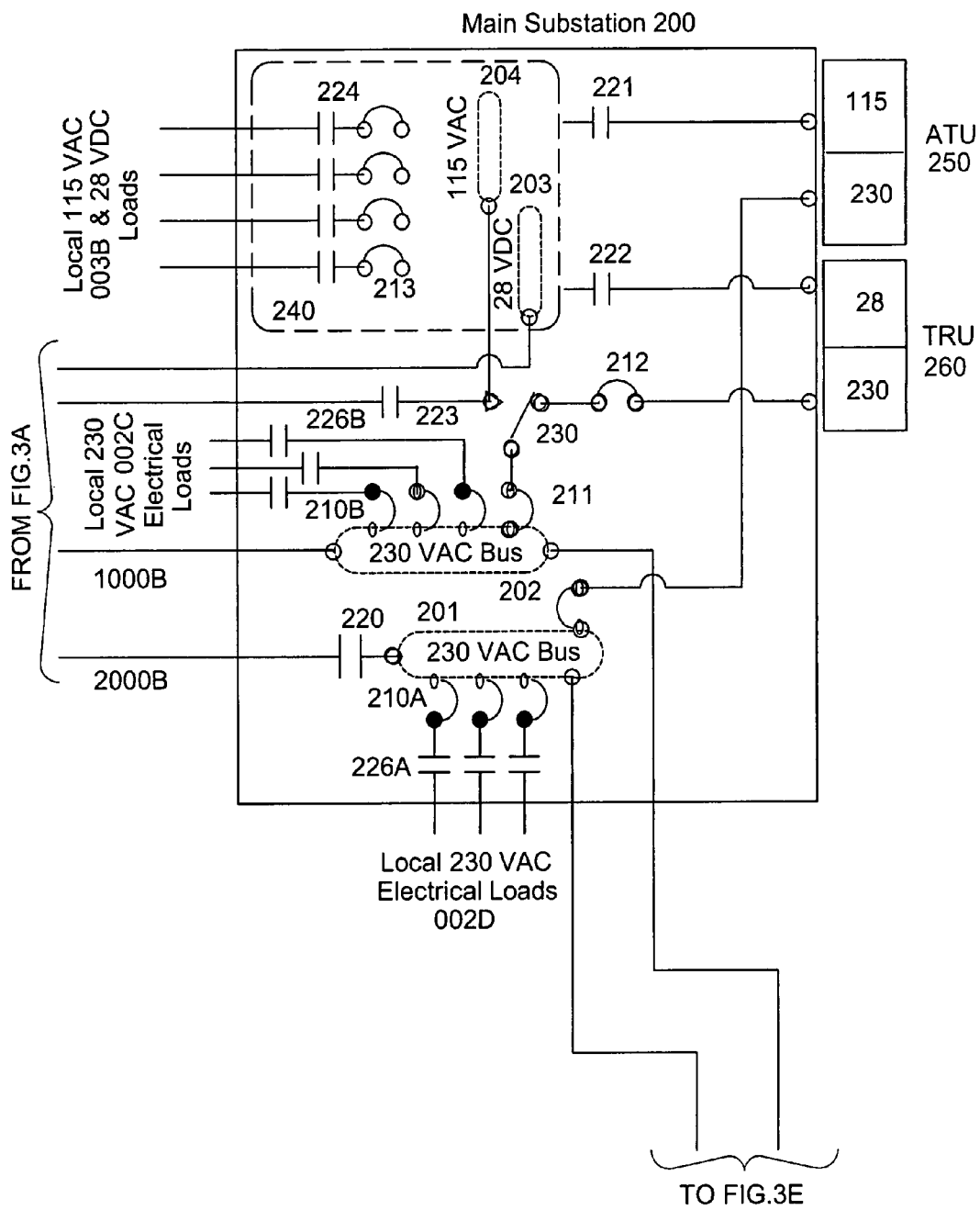
Figure 3C:
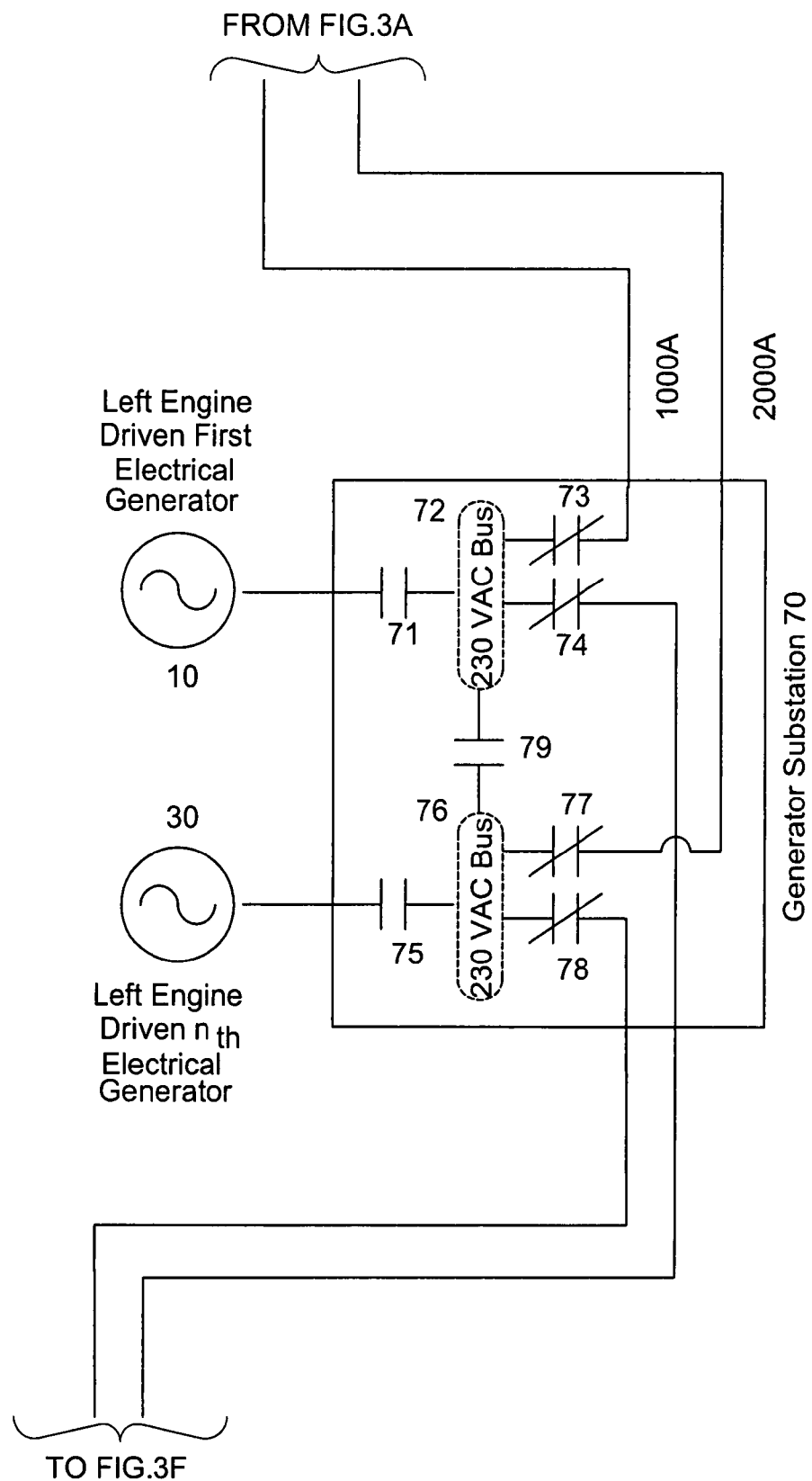
Figure 3D:
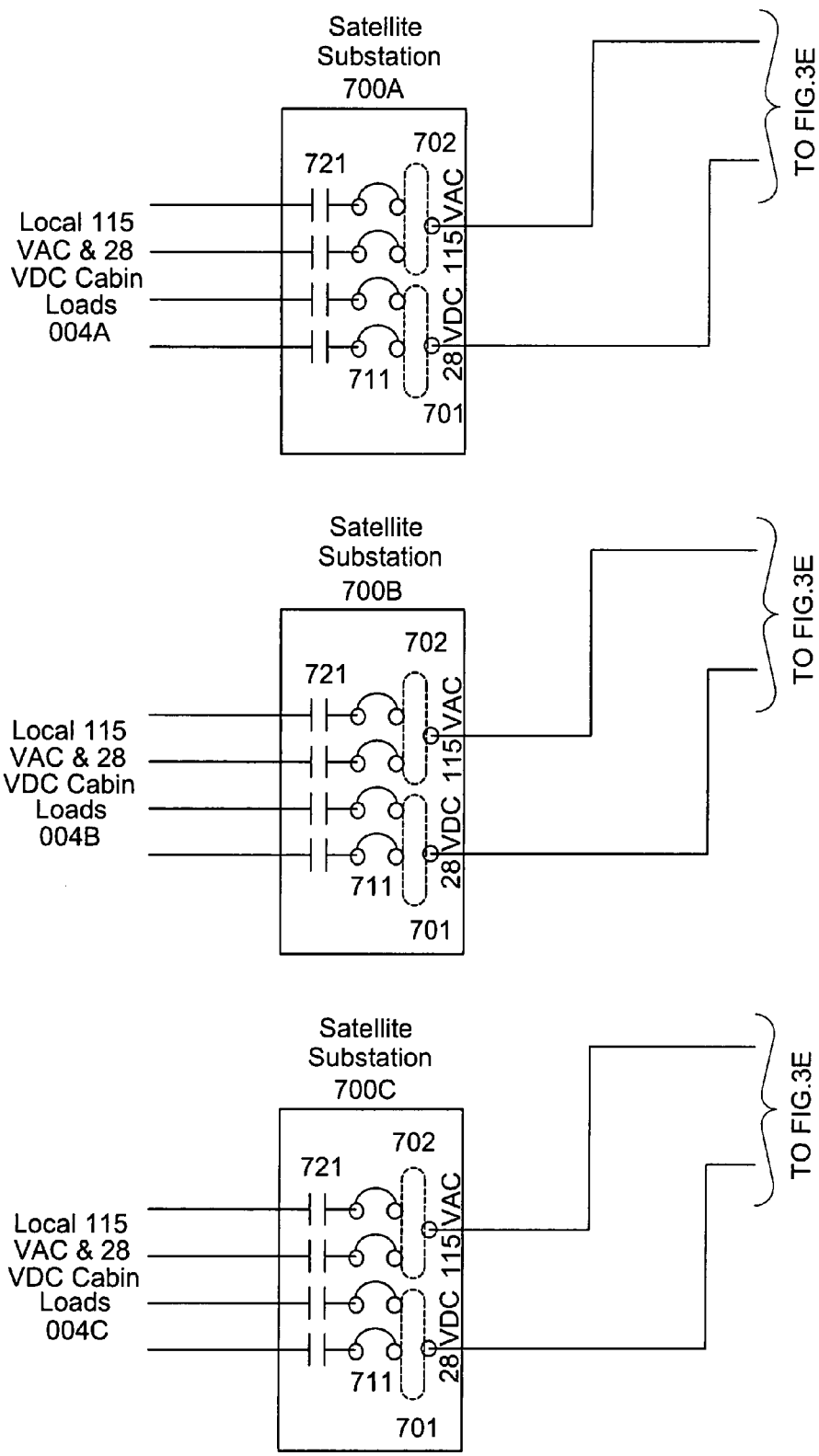
Figure 3E:
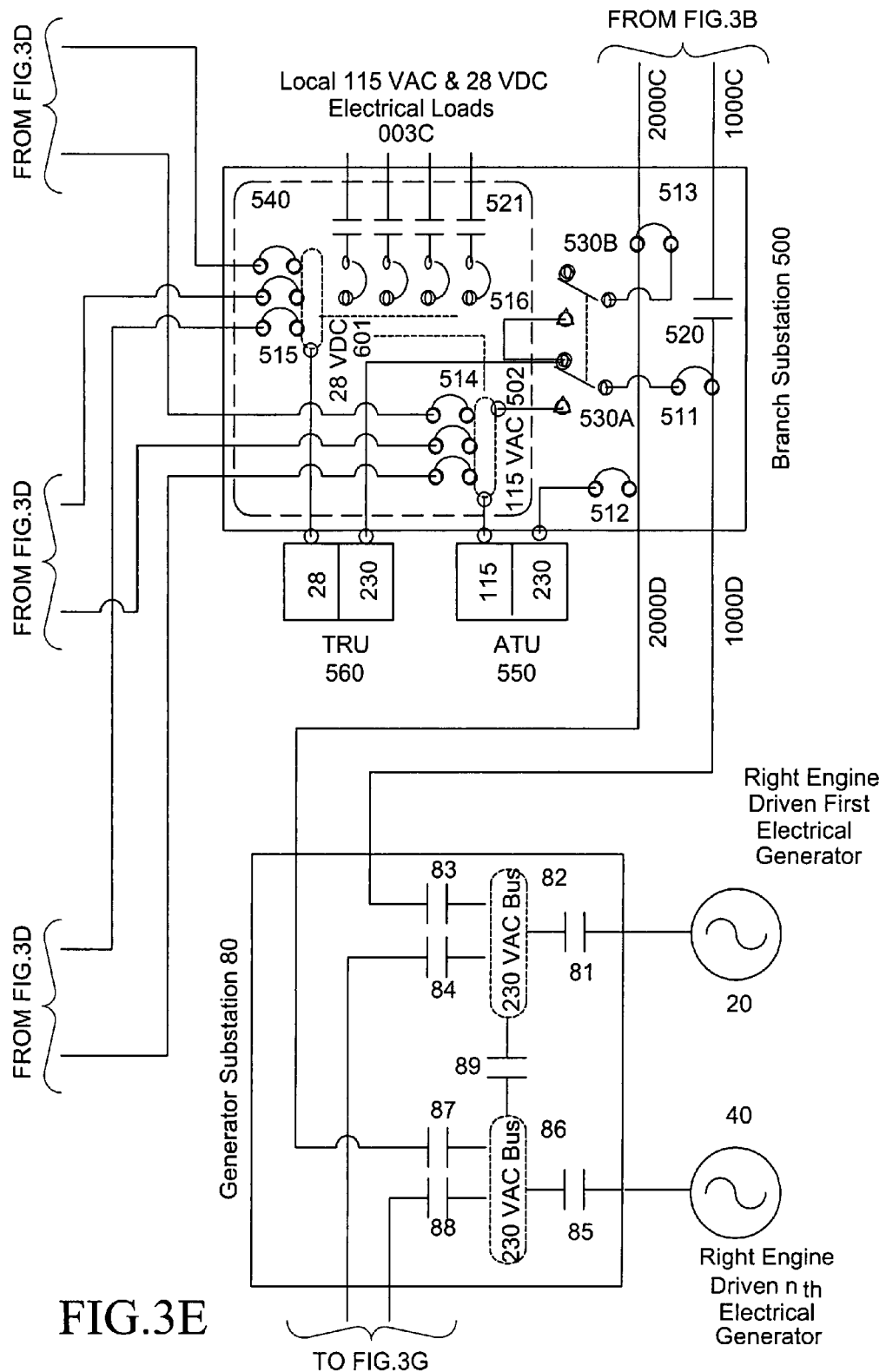
Figure 3F:
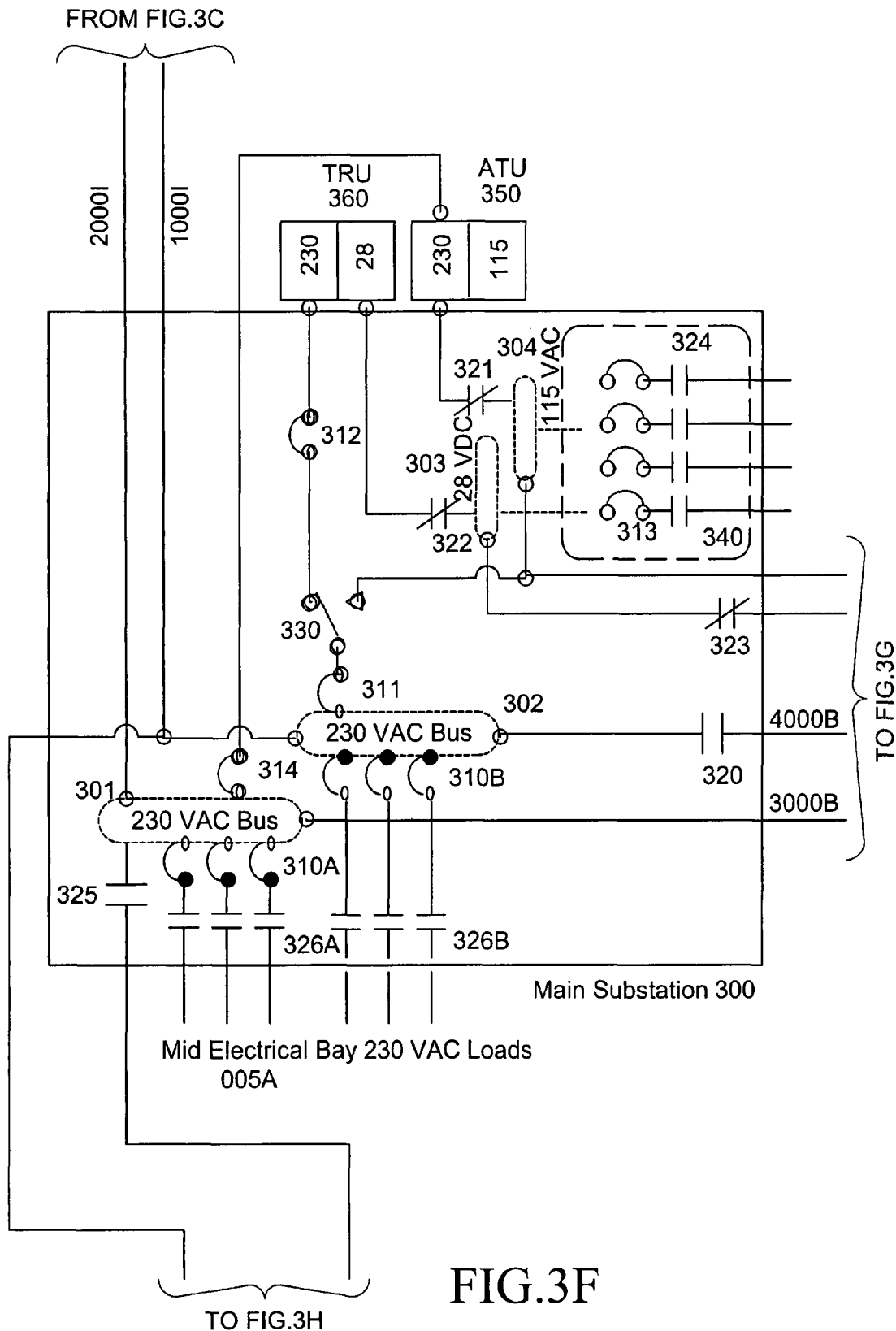
Figure 3G:
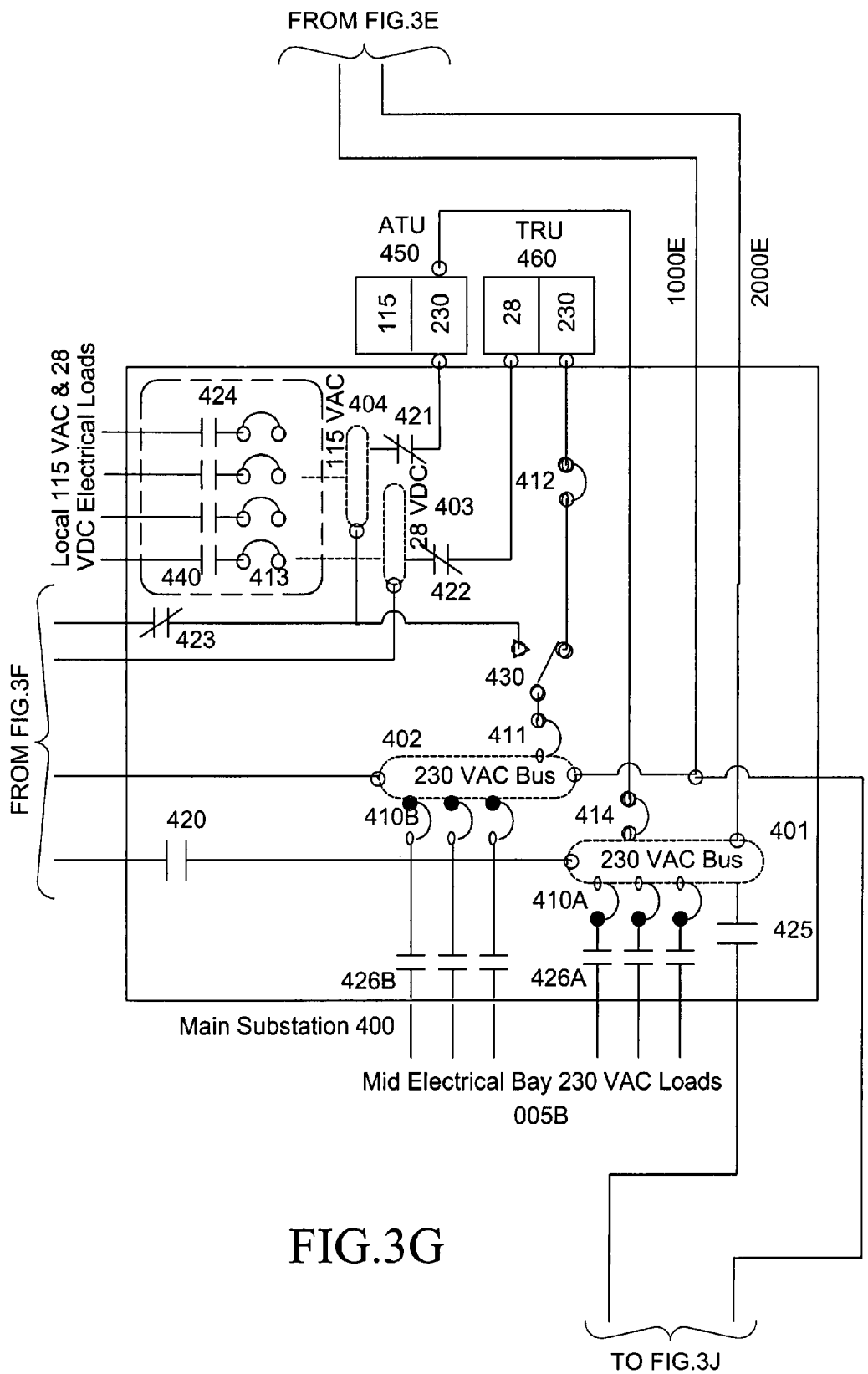
Figure 3H:
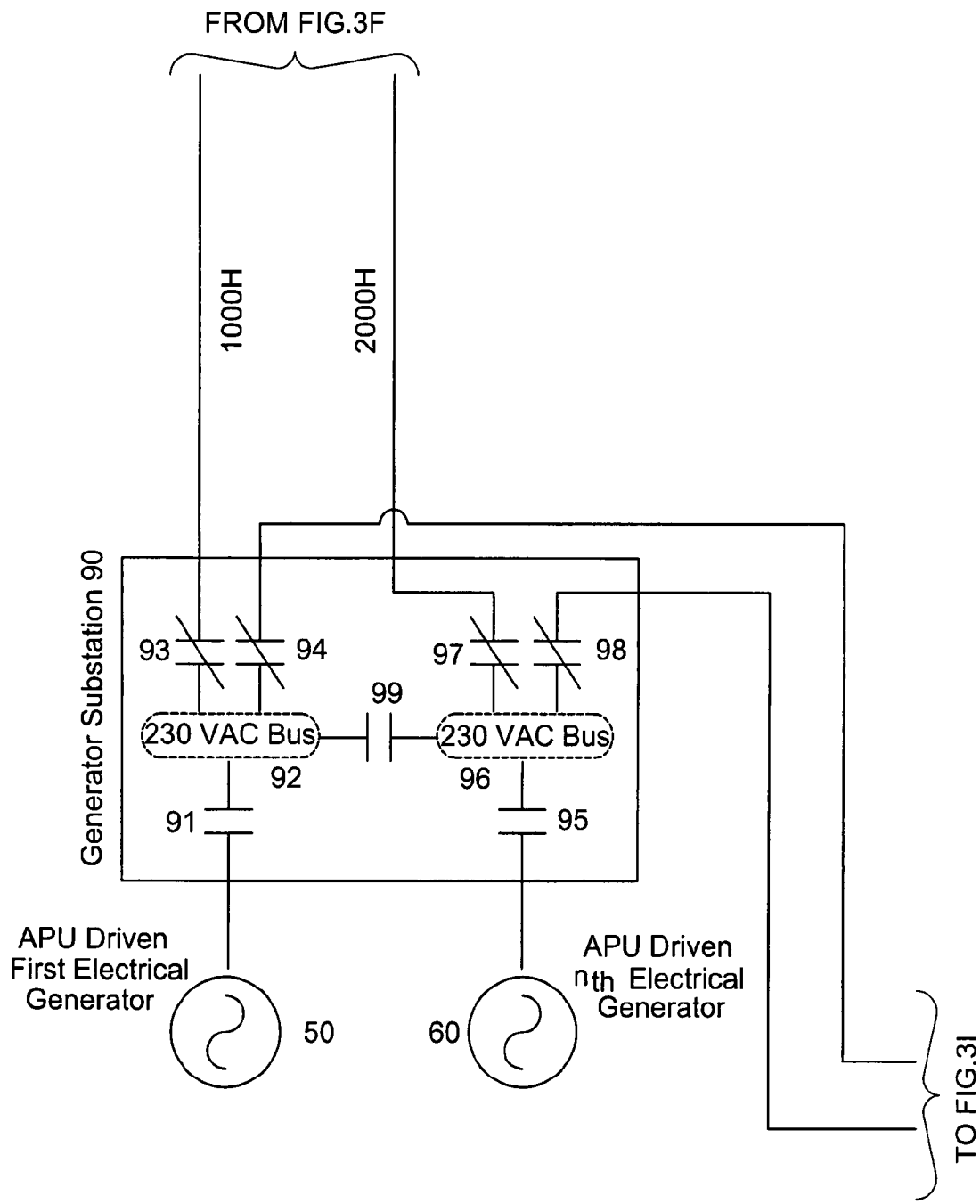
Figure 3I:
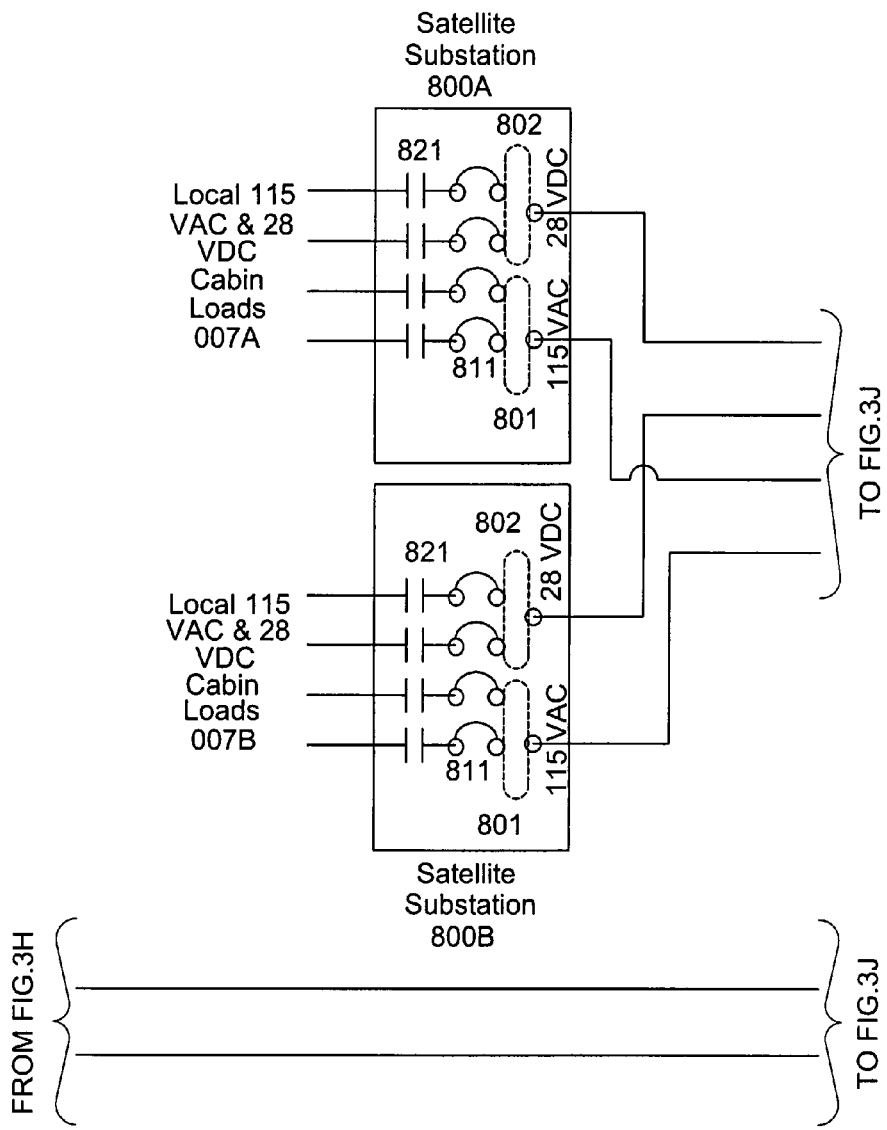
Figure 3J:
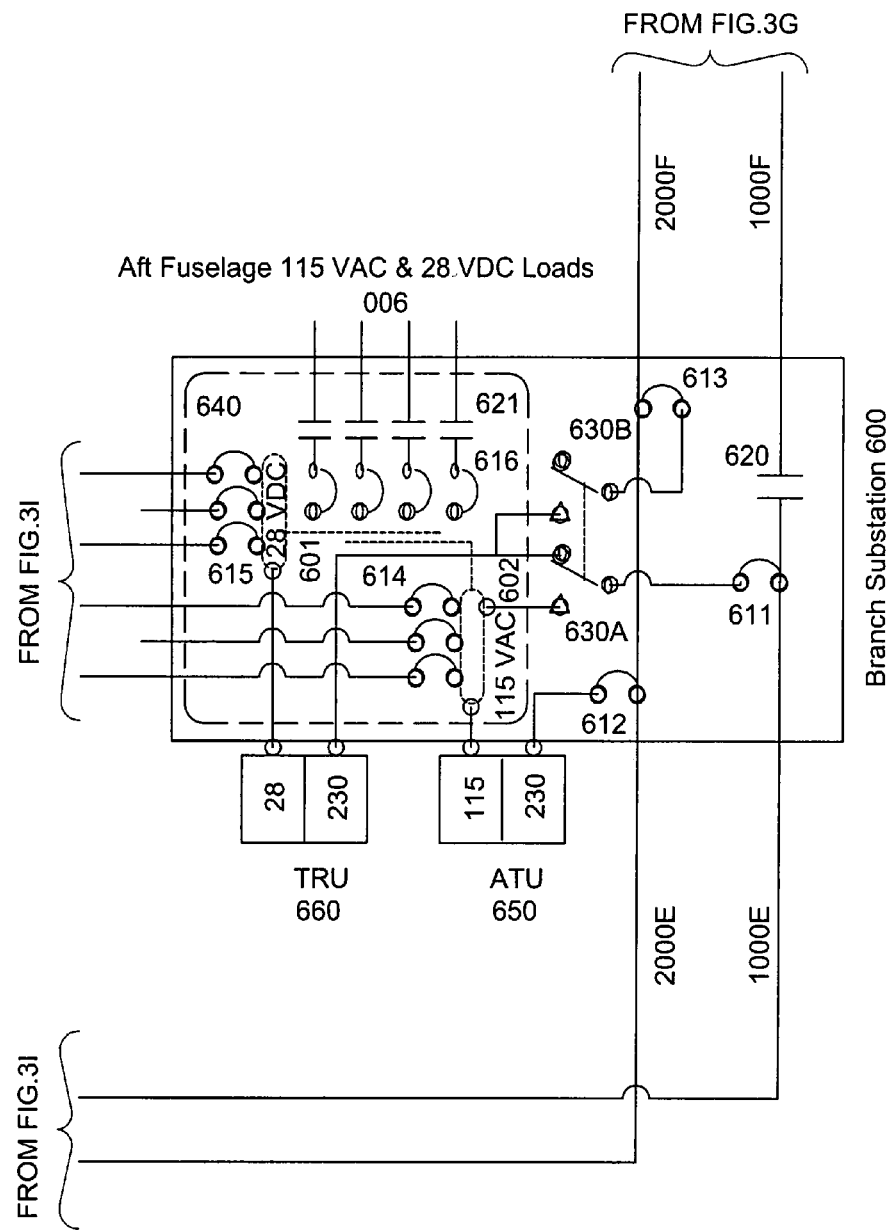

Aspects of the invention are more specifically set forth in the accompanying description with reference to the appended figures. FIG. 3 is a diagram of an architecture that reduces vehicle wiring by using high voltage primary power and distributed low voltage conversion equipment to feed secondary power boxes, according to an embodiment of the present invention. The architecture in FIG. 3 is modular, and is presented in a ring structure. The architecture provides a high level of integration between distinct levels of power distribution within each modularly arranged distribution panel.

Due to its large size, the diagram of FIG. 3 is split into 10 portions, which are labeled as FIGS. 3A, 3B, 3C, 3D, 3E, 3F, 3G, 3H, 3I, and 3J. FIGS. 3A-3J connect to each other as shown on the connection map of FIG. 3, and as indicated in each of FIGS. 3A-3J.

Figure 1:
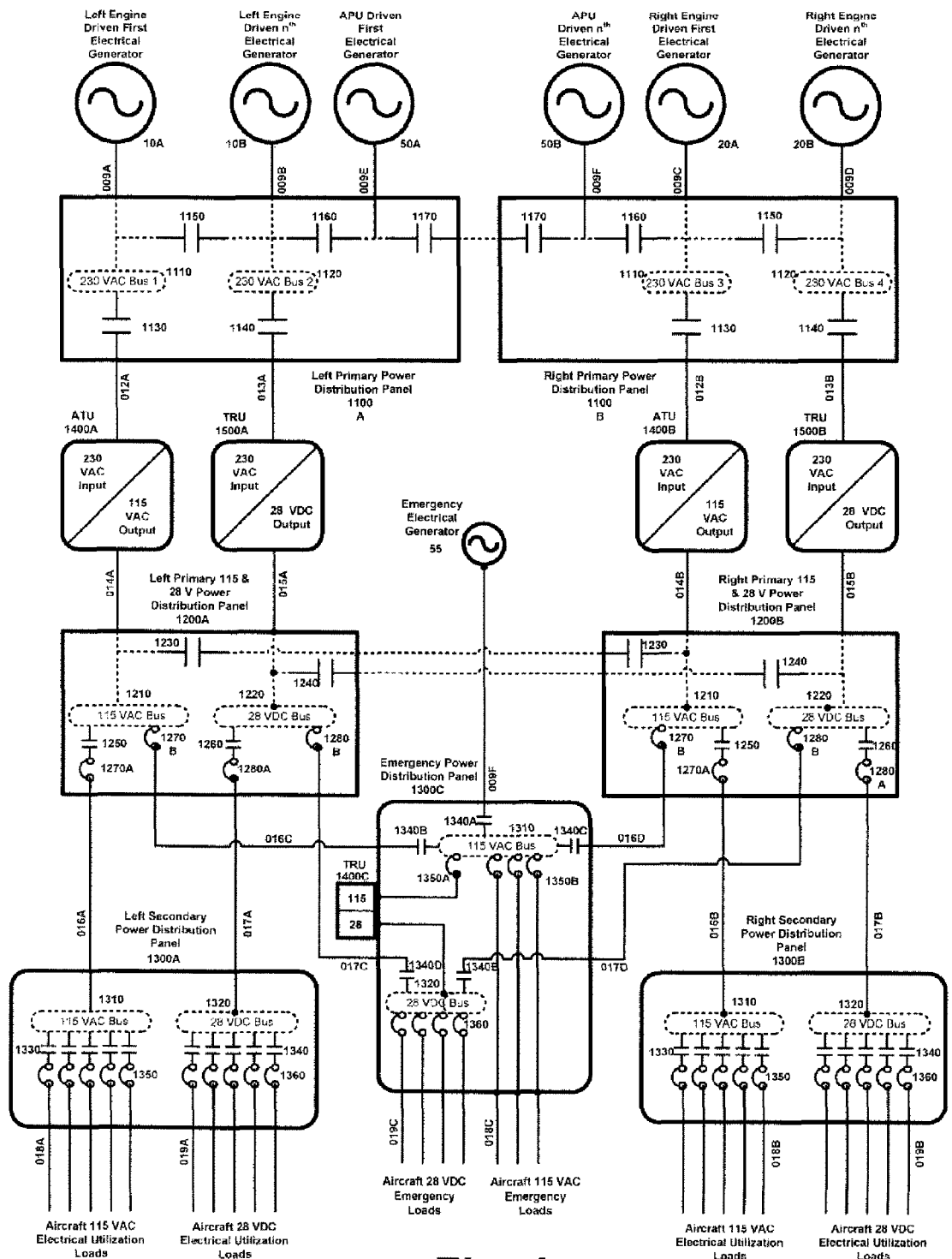
FIG. 1 illustrates a block diagram of a conventional centralized power distribution architecture.

The term "substation" as used in the present description refers generally to the modules that form the architecture system. The term "substation" is used in FIG. 3 to identify the distribution elements and to differentiate these elements from the typical/conventional separate hierarchical panels of FIGS. 1 and 2. In the architecture of FIG. 3, four types of substations are employed: generator substations, main substations, branch substations, and satellite substations. A substation type reflects the role of the substation, the location of the substation in the ring of the architecture, and the function of the substation within the architecture.

The architecture illustrated in FIG. 3 includes the following components: at least one left engine generator 10; left second (or more) engine generator(s) 30; at least one right engine generator 20; right second (or more) engine generator(s) 40; at least one Auxiliary Power Unit (APU) driven generator 50; second (or more) APU driven generator(s) 60; an external power input (001); a left generator substation 70; a right generator substation 80; a left forward main substation 100; a right forward main substation 200; a left aft main substation 300; a right aft main substation 400; one or more forward branch substations 500; one or more aft branch substations 600; one or more forward satellite substations 700A, 700B, 700C; one or more aft satellite substations 800A, 800B; ring bus feeders 1000A-1000I and 2000A-2000I; cross tie feeders 3000A, 4000A, 3000B, 4000B; and various load outputs 002-007 to vehicle utilization loads. Other miscellaneous connections are included in the architecture of FIG. 3 and are herein described.

Figure 2:
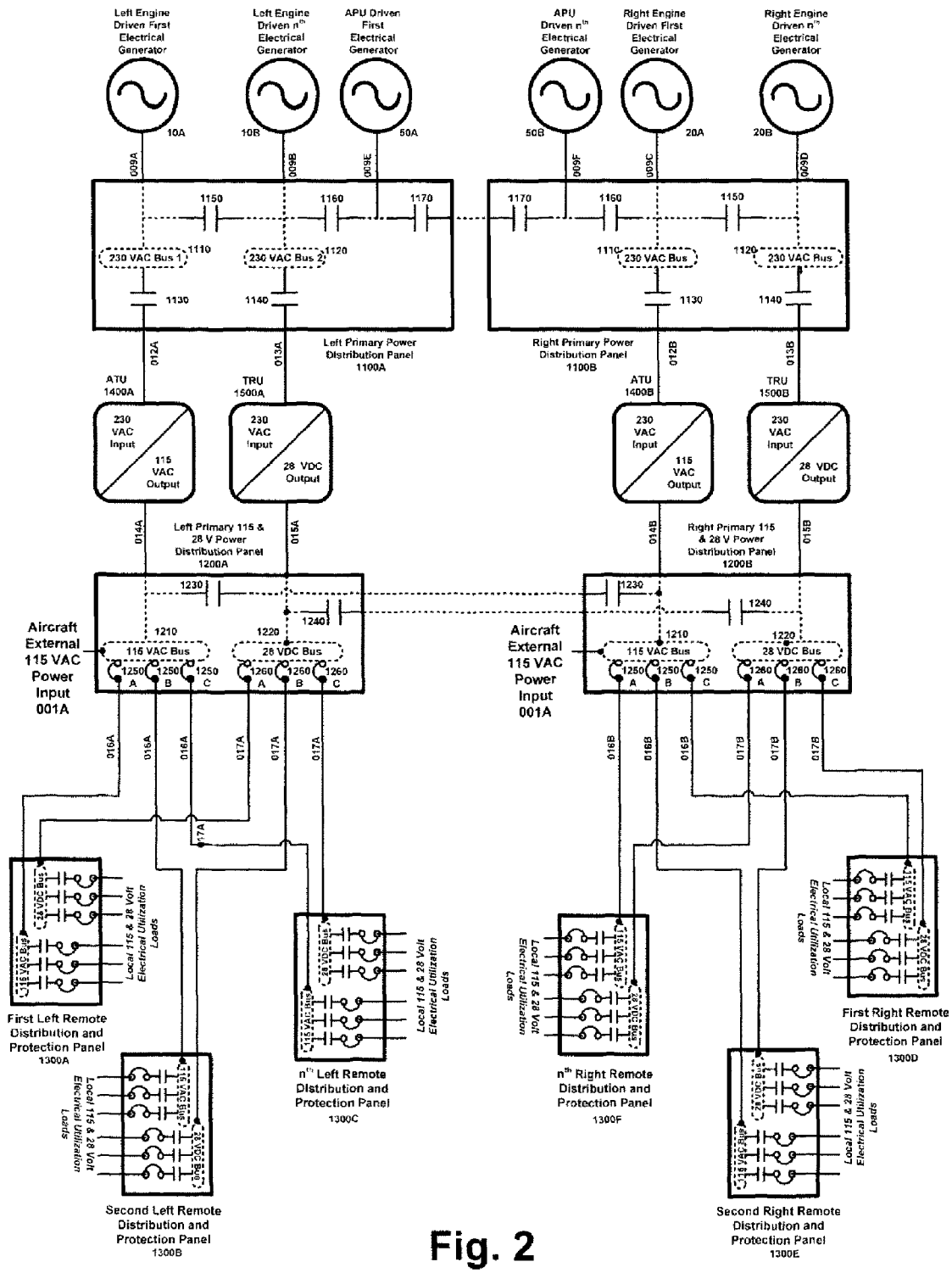
FIG. 2 illustrates a conventional contemporary non-centralized secondary power distribution architecture with a centralized primary distribution and conversion system.

The architecture illustrated in FIG. 3 reduces cable weight by eliminating low voltage feeder cables 016A, 016B, 017A, 017B previously shown in FIG. 2. In FIG. 2, a centralized system of conversion equipment was connected to high voltage primary distribution panels, low voltage primary distribution panels, and remote secondary distribution and protection panels. The architecture of FIG. 3, on the other hand, distributes high voltage power directly to the area of secondary power demand.

The term "high voltage" as used herein refers to any voltage level or power quality type that is practical and achievable for the purpose of vehicle electrical power generation and distribution. High voltage may be, for example, a voltage higher than 115V AC and 28V DC, which are in extensive use today. Higher voltage reduces distribution currents. Hence, higher voltage directly reduces the weight of distribution hardware and cabling.

The architecture of the present invention provides techniques and hardware to achieve an architectural improvement over existing designs. The architecture and methods of this invention are not specific to any particular power type or voltage.

Newer vehicle electrical systems use higher power generation voltage levels, such as 230 VAC or 270 VDC. For this reason, 230V AC high voltages are shown in the exemplary implementation illustrated in FIG. 3, to demonstrate the operation of the architecture. Major weight reductions and installation benefits are achieved when a high voltage, such as 230 VAC in the exemplary embodiment of FIG. 3, is distributed directly to the area of satellite substations (700A, 700B, 700C, 800A, 800B), as illustrated in FIG. 3. However, any high power generation voltage levels can be used with the architecture described in the present invention, to achieve weight reductions proportional to the voltage level used.

The high voltage feeder cable ring bus architecture illustrated in FIG. 3 is configured to provide dual redundant and independent power feeds both forward and aft from each engine generator substation 70 and 80. The architecture illustrated in FIG. 3 is also configured to provide dual redundant and independent power feeds forward from the APU generator substation 90. The architecture in FIG. 3 may use an engine generation installation in an area close to the middle of the vehicle length, as used in wing mounted engines in aircraft for example, with APU generators 50 and 60 located in an aft position corresponding to typical tail cone APU installations for aircraft. However, the modularity of the architecture of FIG. 3 allows generator substations to be moved along, to intersect the ring bus and suit various engine or APU positions. The main, branch and satellite substations may be similarly repositioned, to optimize the installed cable weight. For example, for an aft propulsion engine aircraft, the generator substations 70 and 80 may be biased rearward to provide the lowest installed weight and satisfy practical installation considerations. Similarly an APU installation in a wing to fuselage fairing of a particular aircraft layout might cause the generator substation 90 to move to a more adjacent location, also perhaps within the same faring.

Generator substations 70, 80 and 90 contain contactors, buses and protection sensors necessary for normal and abnormal operation and reconfiguration capability of the architecture.

Appropriately sized local power conversion equipment items are located throughout the system of FIG. 3, adjacent to the substations. Secondary power conversion equipment may include various power conversion items, such as: transformers or autotransformers 150, 250, 350, 450, 550, 650; transformer rectifier units (TRU's) or regulated TRU's 160, 260, 360, 460, 560, and 660. Active power converters may be used in place of, or together with traditional converter methods, as new technologies are developed in the areas of power conversion. In one possible configuration, various power conversion items may be combined together, using similarities between the transformer functions inside the conversion equipment.

The power conversion equipment illustrated in FIG. 3 generates conventional power (for example, 115V AC and 28V DC) in quantities required by local loads/equipment. For example, the TRU 160 associated with substation 100 converts 230 VAC voltage power. This voltage power is supplied through the feeder system from the generator substations (70, 80, and/or 90), and is applied through the 230V AC bus 102 to the TRU 160 inputs. TRU power is then applied to the 28V DC bus 103 included in the main substation 100. Power output from the 28V DC bus 103 is further distributed to 28V DC loads 003A, which are local to the main substation 100.

Similarly, ATU 150 converts 230V AC voltage power. This voltage power is supplied through the feeder system from the generator substations, and is applied to the ATU 150 through the 230V AC bus 101 in the main substation 100. ATU 150 produces converted 115V AC power, which is then applied to the secondary 115V AC distribution bus 104. The converted power is then distributed to 115V AC loads 003A, which are local to the main substation 100. Connection, distribution and conversion for each main or branch substation may be similarly implemented, as illustrated for the main substation 100 and the surrounding elements in FIG. 3.

A compromise between completely distributed power conversion and partially distributed power conversion is realized using the satellite substations 700A, 700B, 700C, 800A, 800B, as illustrated in FIG. 3. The branch substations 500 and 600 supply distributed low voltage power to the satellite substations 700A, 700B, 700C, 800A and 800B. Satellite substations are integrated along the length of the ring bus, supported by conversion and distribution functions of the branch substations, to provide feeders and distribution wire weight in areas that cannot support their own conversion equipment because of the power magnitude required, or because of physical installation limitations.

The implementation of satellite substations supplied by branch substations represents a preferred embodiment of the present invention. With this preferred implementation, the main and branch substations and associated conversion equipment reside physically along the 230V AC feeder routing, as the routing travels along the periphery of the vehicle length. Satellite substations may be used, for example, to supply passenger cabin loads that usually reside in overhead or underfloor locations, close to the centerline of a cabin structure. Locations for such loads typically pose equipment volume restrictions for associated secondary distribution or conversion equipment. Hence, size and weight reduction in hardware and appropriate hardware placement are important for providing distribution to such loads, support minimized distribution capability, and provide a distributed system with reduced length for load wiring. The restrictive locations for such cabin loads do not facilitate thermal dissipation of heat. Heat generating components are kept to a minimum and heat accumulation is avoided in the architecture of FIG. 3, by using the satellite substations. With this implementation, heat produced by conversion equipment, distribution buses and switching hardware is suitably reduced in restricted locations such as those mentioned above.

The ring bus design provides additional advantages for the architecture in FIG. 3. The ring bus design provides means to distribute high voltage power with minimum cabling weight. The ring bus design also provides system operation enhancements above conventional/traditional "point to point" distribution architectures. When dual system generators are used per engine, the feeder structure is implemented to enable concurrent supply from both generators to converters and distribution buses within each substation in the dual design. Dual system generators per engine may be used to minimize the physical size of the generators and their effect on the surrounding structure. Dual system generators per engine also allow the system to produce larger aggregate power generation outputs. If the generators produce variable frequency power, the outputs of the generators are separated, to achieve proper system operation and power quality. The resultant feeder cable orientation illustrated in FIG. 3 provides a loop of dual redundant feeders (1000A though 1000I, and 2000A thorough 2000I), to produce a routing of 230V AC power around the vehicle. Since the ring bus configuration can be broken through appropriate contactor deactivation, any segment of the ring can be utilized by the system, under coordinated control from an expert power system control, to route power in either direction along a segment length. This bi-directional routing of 230V AC power around the vehicle intersects each of the distribution substations, as illustrated in FIG. 3. The bi-directional routing of 230V AC power in FIG. 3 provides much more flexibility for power supply routing that the architectures of FIGS. 1 and 2.

Along the length of the 230V AC feeders (1000A though 1000I, and 2000A through 2000I), contactors are strategically placed, to allow isolation of specific segments. The contactors can be energized as appropriate, to interrupt power along any feeder segment. Furthermore, the contactors can also be coordinated along a feeder segment as controlled by an expert bus control system, to set the direction of current flow.

An expert bus control system may be implemented as described in the US patent application titled "Method and Apparatus for Electrical Energy and Knowledge Management on a More Electric Vehicle", application Ser. No. 11/196,323, by Hassan A. Kojori, Rodney G. Michalko, and Sophia Konyukhova, the entire contents of which are hereby incorporated by reference.

With this implementation, the ring bus architecture can isolate a section of the ring bus in the event of a power failure within that section. While isolation of a malfunctioning section can impact a load along that section, it does not impact power distribution to downstream loads, due to the ring bus ability to feed power in reverse from other active power supplies through appropriate closure of ring bus contactors along the respective ring bus feeders. By contrast, typical/conventional distribution systems that rely upon point to point feeders and contactor connections, suffer drastic service loss due to isolation of a malfunctioning section, because the isolation of a malfunctioning section affects power distribution to downstream loads.

Exemplary control of the ring bus is described herein for the forward main substations 100 and 200 and the main generator substations 70 and 80. Similar functions and control are associated with the other substations within the architecture.

During normal operation within generator substation 70, generator 10 is connected to feeder 1000A through the 230V AC bus 72 and contactor 73. Feeder 1000A connects to the 230V AV bus 102, and subsequently powers 230V AC loads 002B from the main substation 100. To avoid undesirable cross-connection of two unsynchronized variable frequency generators (10 and 20), contactor 120 in main substation 100 is kept open.

Similar control is implemented for the generator substation 80. In this case however, the power passes through the branch substation 500 before reaching the main substation 200. Generator 20 is connected to feeder 1000D through the 230V AC bus 82 and contactor 83. Feeder 1000D passes through contactor 520 in branch substation 500, and continues along feeder 1000C to the 230V AC bus 202. Feeder 1000C subsequently powers 230V AC loads 002C from the main substation 200.

In the event of a loss of output from generator 10, the power feed from generator 20 to the loads of substation 100 can be reestablished through the closure contactor 120 in substation 100. The architecture of FIG. 3 thus provides a higher level of power availability than typical point to point distribution architectures.

Power recovery could also be accomplished in this architecture through the closure of cross tie contactor 79 in generator substation 70. However the power supplied to generator substation 70 may not be available in the event of an engine failure in which both generators 10 and 30 have failed. Hence, during generator failure, the architecture of FIG. 3 provides a higher level of power availability than typical point to point distribution architectures.

Therefore, the ring bus configuration of FIG. 3 can control flow and direction of power between available sources, and permits an increased availability of aircraft power in the event of a power supply loss.

For additional enhancement of the system operation provided by the ring bus in FIG. 3, the main substations in each location have a cross tie capability for 115V AC and 28V DC loads. This arrangement is useful for more critical system loads supplied in the main electrical equipment bays. The cross tie capability is incorporated to provide local bus support capability during cable feeder faults. The cross tie capability increases the availability of the architecture for critical systems. The cross tie capability minimizes the number of large contactors required to fully isolate each feeder section (1000, 2000) in the event of cable feeder faults. Using the cross tie cables, critical 115V AC or 28V DC power can still be supplied to loads during cable feeder faults. In the event of a 230V AC feeder fault in a particular segment, the respective 230V AC bus within that segment would be considered lost, while the 230V AC power supply to its companion substation is maintained. Hence, the appropriate bus tie between the low voltage buses can close to reestablish power flow for critical functions.

For example, when a fault of feeder 1000A or bus 102 (of main substation 100) occurs, contactors 73 and 120 open to isolate the faulted segment. Bus 203, which is fed by the operating TRU 260 in substation 200, is cross connected by the bus control system through closure of contactor 123 in substation 100. In this manner, power to the DC bus 103 is reestablished in substation 100 through the cross tie permitted along feeder 4000A. Hence, even though feeder 1000A or bus 102 is faulted and the output of TRU 160 is lost, the local load services connected to DC bus 103 are still powered from TRU 260.

An additional feature of the architecture in FIG. 3 is that the 230V ring bus alternately feeds TRUs and ATUs supplying the 28 and 115 V buses in main substation pairs. This feature provides additional operating efficiency, because the 28 and 115 Volt services of the same substation do not depend solely on one ring, at a given time.

For example, in substation 100, ATU 150 is connected to the 230V AC bus 101 which is part of feeder ring 2000. In substation 200 ATU 250 is connected to 230V AC bus 201 which is part of feeder ring 2000. The reverse is true for the respective TRUs associated with substations 100 and 200. Specifically, in substation 100, TRU 160 is connected to 230V AC bus 102, which is part of feeder ring 1000. In substation 200, TRU 260 is connected to 230V AC bus 202 which is part of feeder ring 1000. This configuration ensures that all low voltage power is not lost within a substation in the event of a fault, because rings 1000, or 2000, or both can feed internal substation power required for control, protection and reporting of electrical system operation.

The architecture of FIG. 3 does not suffer from shortcomings that are typically associated with conventional architectures, when such conventional architectures are used on "More Electric" vehicles.

On "More Electric" vehicles, the selection of 230V AC power enables easy conversion of AC power to high voltage DC power for use in motor controller functions. However, during ground operations of an aircraft, for example, 230V AC may not be available. Only 115V AC ground power is available. To adjust to this limitation of the ground support infrastructure, aircraft architectures, can obtain 230V AC by reverse feeding large centralized ATUs in the system with 115V AC. The ATU output is stepped up to the 230V AC level through the existing turns ratio in the transformer. Hence, if 230V AC is not available from ground based airport facilities, 115V AC power can be used to obtain the 230V AC power necessary for engine starting and high power motor functions.

In contemporary architectures such as the architecture illustrated in FIG. 2, 115V AC ground power is applied to 115 VAC buses 1210 and 1220 in the primary low voltage distribution panels 1200A and 1200B respectively. The power is then fed in a reverse direction through the ATUs 1400A and 1400B, onto the distribution networks in the primary distribution panels 1100A and 1100B.

In the architecture of FIG. 3, the ATUs are smaller. A single, smaller ATU connected to a 115 VAC external power supply, may be unable to transform sufficient power to perform a required start function. The architecture presented in FIG. 3 provides a novel solution to this problem and offers the advantage of increased availability of 230V AC power conversion from many existing smaller 115V AC power supplies. In an exemplary embodiment, a particular motor controller function, such as a function used for engine start, utilizes approximately 100 KVA of power. ATUs can be individually sized for the output capacity of 100 KVA of power, to allow for sufficient redundancy. These ATUs also support normal 115V AC loads during normal operation. Coincidentally, when duty cycles are considered, these two operating modes of the ATUs are similar in overall power capacity. More specifically, the start mode output requirement from an ATU is higher but requires a shorter time period. This fact permits an ATU short time capacity greater than the continuous normal rating of the ATU. These two operation modes of an ATU permit efficient dual use conversion in the ring bus architecture, as well, as explained below.

In the ring bus configuration illustrated in FIG. 3, the 115V AC power is produced and distributed throughout the aircraft. Appropriate connections are provided in the ring bus architecture, to first supply the ATUs with 115V AC external power and then combine all the ATU outputs at 230V AC and obtain an aggregate sum that is applied to the 230V AC buses, to support 230 V AC services, such as engine start. This is accomplished without dedicated ATUs, and without extra feeder connections to the systems. Furthermore, the collective output from distributed ATUs used for normal distribution loads exceeds the total capacity required for any engine start. Thus, the collective output from distributed ATUs allow the system to support engine start even when some ATUs do not operate. Hence dispatch reliability of the architecture of FIG. 3 is not jeopardized by an ATU failure.

With reference to FIG. 3, 115V AC power can be input in the architecture through contactor 125 in substation 100. External power may equally be applied in an alternate configuration to any point along the feeder ring 1000. When 115V AC power is input in the architecture in FIG. 3, engine generators are deactivated and their respective line contactors 71 and 75 in substation 70, and 81 and 85 in substation 80 are open. In this initial configuration in which engines are not operating, feeder cable rings 1000 and 2000 are not utilized, and thus can be used for alternative power distribution purposes. In order to first provide 115V AC power to all ATUs, the feeder ring 1000 is connected to the 115V AC external power input. The connection to the external 115V AC input power is achieved through the closure of external power contactor 125 in substation 100. 115 V AC power is then applied to bus 102. Since all 230V AC local loads were previously isolated from the bus, the ring bus contactors in each substation associated with ring 1000 are closed. Next, contactors 120, 520, 83, 84, 620, 94, 93, 74 and 73 close in succession, to complete the ring connection to the 115V AC external power source. Additionally, a power transfer relay (130, 230, 330, 430, 530, 630) is activated within each substation, to remove the connection to the TRU from ring bus 1000, and apply the 115V AC power to the 115V AC bus within each substation. ATU output contactors (121, 221, 321, 421) are subsequently closed, and direct connections are provided in the branch substations, so that each ATU is energized with 115V AC power. Using the inherent step up conversion capability of the individual ATUs, output 230V AC power is provided and applied to the ring bus 2000. As a result, the aggregate sum of all ATU capacities are now applied to the 2000 series feeders, and can be made available to 230V AC high power loads. Hence, existing distribution system cables, contactors, and associated hardware are used to distribute external power to the vehicle, and reduce or eliminate distribution weight associated with external power distribution and conversion. Furthermore, normal 115 V AC and 28V DC loads are supported from external power, together with the 230V AC loads attached to the 2000 series ring bus.

The present invention implements a method and an architecture for reduction of vehicle wiring through incorporation of modular power distribution panels providing primary and secondary distribution functions in a ring arrangement. The architecture is combined with a distributed system of associated power conversion units that provide localized conventional voltage levels in quantities consistent with local power demand, while allowing an aggregate summation of their output when applied in a reverse flow conversion of external power. The architecture takes advantage of existing architectural attributes of More Electric vehicles, and solves issues associated with such More Electric vehicles. The architecture is equally applicable to traditional vehicles, and provides remote secondary feeder weight reduction through appropriate scaling of modular sub-architectural elements within the system.

Embodiments described in this application eliminate dedicated feeders to secondary power distribution panels, offer alternative and more efficient power distribution solutions, and provide higher availability for electrical power distribution, through coordination of ring bus contactors and protection devices. Such coordination is achieved with an expert supervisory control system with advanced control capabilities. An expert supervisory control system may be implemented as described in the US patent application titled "Method and Apparatus for Electrical Energy and Knowledge Management on a More Electric Vehicle", application Ser. No. 11/196,323, by Hassan A. Kojori, Rodney G. Michalko, and Sophia Konyukhova, the entire contents of which are hereby incorporated by reference.

Although numerical values for power and voltage were used in the architecture diagram in FIG. 3, any power and voltage levels can be used with the architecture of the current invention. The number of substations and cable connections in FIG. 3 can also be changed, without departing from the spirit and scope of the present invention.

Although some aspects of the present invention have been described in the context of vehicle/aerospace electrical distribution systems, the principles of the present invention are applicable to any environments that use electrical power distribution systems, such as industrial environments, ships, residential electrical networks, etc.

I claim:

1. A system for power conversion and distribution, said system comprising:
    a first generator substation receiving power from a first electrical generator on a first alternating current (AC) bus;
    a first main substation for distributing converted power from a second AC bus to at least one load, said load being local to said first main substation;

a ring bus comprising;
  at least the first and second AC buses;
  at least two electrical interconnection paths between the first and second buses, each of the paths including at least one ring bus feeder;
  wherein the first and second buses each have a first end and a second end opposite the first end;
  wherein a first one of the electrical interconnection paths interconnects the first end of the first AC bus with the second end of the second AC bus;
  wherein a second one of the electrical interconnection paths interconnects the second end of the first AC bus with the first end of the second AC bus so that the AC buses and the electrical interconnection paths provide a ring arrangement for current passage at one AC voltage;
at least one satellite substation for powering a remote load,
wherein said ring bus connects said first generator substation and said first main substation in a ring arrangement, and said at least one satellite substation receives power from said ring bus through a branch substation; and
wherein said branch substation is connected inside said ring arrangement.

2. The system as recited in claim 1, further comprising:
a second main substation for distributing converted power to at least one load, said load being local to said second main substation, said second main substation being connected to said ring bus,
a first conversion device associated with said first main substation,
a second conversion device associated with said second main substation, and
a control system for controlling contactors, so that outputs of said first and second conversion devices are additively combined.

3. The system as recited in claim 1, further comprising:
a transformer rectifier unit connected to said first main substation,
an autotransformer connected to said first main substation,
a second electrical generator providing power to said first generator substation,
wherein said ring bus includes first and second feeder rings, said transformer rectifier unit and said first electrical generator are connected to said first feeder ring and said autotransformer and said second electrical generator are connected to said second feeder ring.

4. The system as recited in claim 1, further comprising:
a second generator substation receiving power from a second electrical generator,
a second main substation connected to said second generator substation, said second main substation distributing converted power to at least one load, said load being local to said second main substation, and
a cross tie connection that can be controlled to electrically connect said first and second main substations.

5. The system as recited in claim 1, further comprising:
a second main substation for distributing converted power to at least one load, said load being local to said second main substation, said second main substation being connected to said ring bus,
wherein, when a fault occurs in said first main substation, contactors along said ring arrangement are controlled to connect said second main substation to said load local to said first main substation.

6. The system as recited in claim 1, wherein said ring arrangement includes contactors that can be controlled to set a direction of a current flow in said ring bus.

7. The system as recited in claim 1, further comprising:
contactors along said ring arrangement, and
a control system for controlling said contactors, to isolate a faulty section in said ring arrangement,
wherein said ring arrangement includes redundant power paths.

8. The system as recited in claim 1, wherein said system is used for power conversion and distribution in an aircraft.

9. A system for power conversion and distribution, said system comprising:
a left generator substation for receiving power from a left electrical generator;
a right generator substation for receiving power from a right electrical generator;
a forward main substation for converting power for at least one forward local load;
an aft main substation for converting power for at least one aft local load;
a ring bus including ring bus feeders; and
a branch substation connected within said ring bus for supplying at least one satellite substation for powering a remote load,
wherein said ring bus feeders connect said left generator substation, said right generator substation, said forward main substation and said aft main substation in a ring arrangement which provides routing of AC power in a first direction around the ring arrangement and in a second direction opposite the first direction around the ring arrangement, and said at least one satellite substation receives power from said ring bus via said branch substation.

10. The system as recited in claim 9, further comprising:
a first conversion device associated with said forward main substation,
a second conversion device associated with said aft main substation, and
a control system for controlling contactors, so that outputs of said first and second conversion devices are additively combined.

11. The system as recited in claim 9, further comprising:
a transformer rectifier unit connected to said forward main substation,
an autotransformer connected to said forward main substation,
a second left electrical generator providing power to said left generator substation,
wherein said ring bus includes first and second feeder rings, said transformer rectifier unit and said left electrical generator are connected to said first ring bus, and said autotransformer and said second left electrical generator are connected to said second ring bus.

12. The system as recited in claim 9, further comprising:
a second forward main substation connected to said right generator substation, said second forward main substation converting power for at least one load local to said second forward main substation, and
a cross tie connection that can be controlled to electrically connect said forward and said second forward main substations.

13. The system as recited in claim 9, further comprising:
a second forward main substation for converting power for at least one load local to said second forward main substation, said second forward main substation being connected to said ring bus,
wherein, when a fault occurs in said forward main substation, contactors along said ring arrangement are controlled to connect said second forward main substation to said load local to said forward main substation.

14. The system as recited in claim 9, wherein said ring arrangement includes contactors that can be controlled to set a direction of a current flow in said ring bus.

15. The system as recited in claim 9, further comprising:
multiple branch substations connected inside said ring arrangement, said multiple branch substations providing power to multiple satellite substations.

16. The system as recited in claim 9, further comprising:
contactors along said ring arrangement, and
a control system for controlling said contactors, to isolate a faulty section in said ring arrangement,
wherein said ring arrangement includes redundant power paths.

17. The system as recited in claim 9, wherein said system is used for power conversion and distribution in an aircraft.

* * * * *